Figure 1:
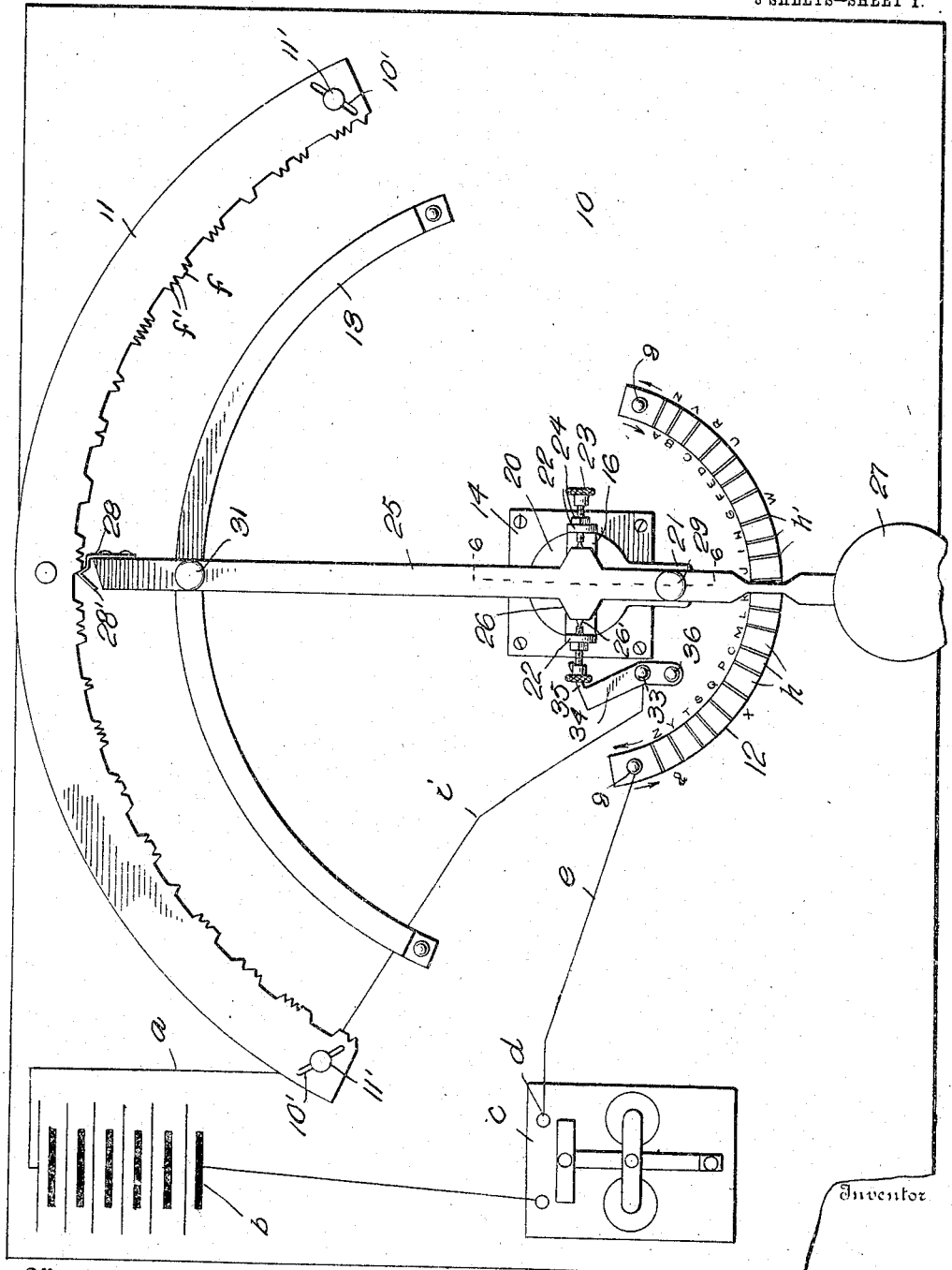

No. 847,921. PATENTED MAR. 19, 1907.
J. W. EARLES.
OMNIGRAPH.
APPLICATION FILED JAN. 24, 1907.

3 SHEETS—SHEET 1.

Witnesses:
G. R. Thomas
H. C. McCartney

Inventor
J. W. Earles
By Chandler & Chandler
Attorneys

No. 847,921. PATENTED MAR. 19, 1907.
J. W. EARLES.
OMNIGRAPH.
APPLICATION FILED JAN. 24, 1907.
3 SHEETS—SHEET 2.
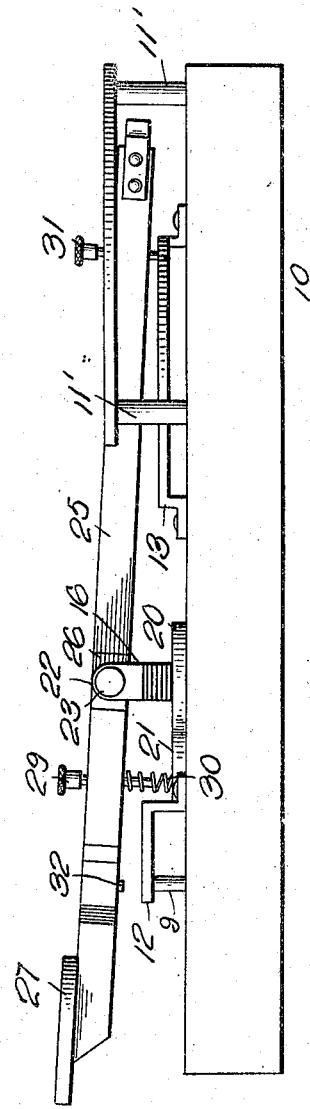
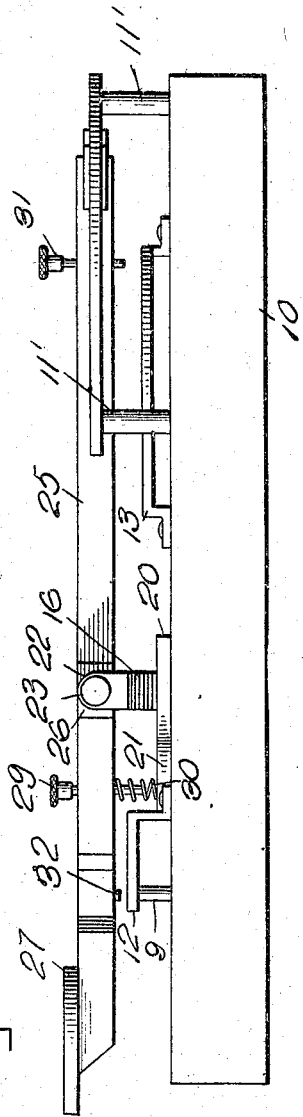
Witnesses
C. R. Thomas
H. C. McCartney
Inventor
J. W. Earles
By Chandler & Chandler
Attorneys.

No. 847,921. PATENTED MAR. 19, 1907.
J. W. EARLES.
OMNIGRAPH.
APPLICATION FILED JAN. 24, 1907.

3 SHEETS—SHEET 3.

Witnesses
G. R. Thomas
H. C. McCartney

Inventor
J. W. Earles

By Chandler & Chandler

Attorneys

UNITED STATES PATENT OFFICE.

JAMES W. EARLES, OF FORT HANCOCK, NEW JERSEY.

OMNIGRAPH.

No. 847,921.    Specification of Letters Patent.    Patented March 19, 1907.

Application filed January 24, 1907. Serial No. 353,911.

*To all whom it may concern:*

Be it known that I, JAMES W. EARLES, a citizen of the United States, residing at Fort Hancock, in the county of Monmouth, State of New Jersey, have invented certain new and useful Improvements in Omnigraphs; and I do hereby declare the following to be a full, clear, and exact description of the invention, such as will enable others skilled in the art to which it appertains to make and use the same.

The present invention relates to omnigraphs.

In devices of this class, which, as is well understood, are utilized by telegraph-operators in practicing receiving and sending telegraphic messages, it has been found necessary to make use of a key circuited with a battery and sounder, as well as a revolving disk provided with a series of projections corresponding to the characters of a telegraphic alphabet and a resilient finger adapted to contact with said projections during the rotation of the disk, so that the operator after becoming acquainted with the "sound," so to speak, of each letter may practice the same upon the key.

It is the object of the present invention to simplify this construction by utilizing a single key, which is adapted for use both to contact with the plate projections in a manner similar to the spring-finger of the construction above referred to and also to be used in the ordinary manner as a telegraph-key in practicing sounding the letters.

A further object of the invention is to simplify the old construction by substituting for the revolving disk a single arc-shaped plate provided on its inner edge with the projections which correspond to the letters of the telegraphic alphabet, a horizontially-movable key being utilized in connection with said plate and provided with a forwardly-extending finger adapted to be moved into contact with the projections on said plate, the key and plate being electrically connected with the usual sounder.

Further objects of the invention will be set forth at length in the following detailed description of the invention and will be specifically referred to in the appended claims, the preferred embodiment of the invention being illustrated in the accompanying drawings, in which like parts are designated by corresponding reference-numerals in the several views.

Figure 4:
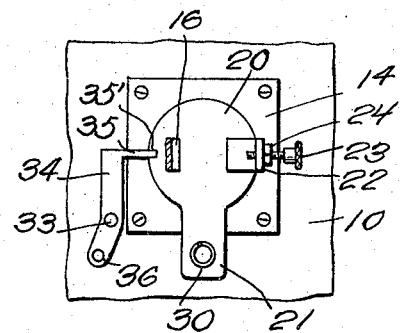
Figure 5:
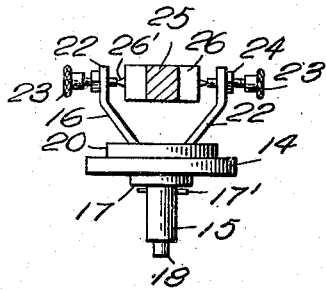
Figure 6:
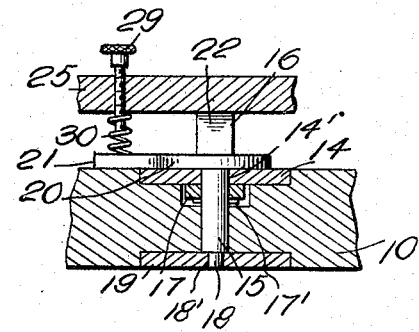
Figure 7:
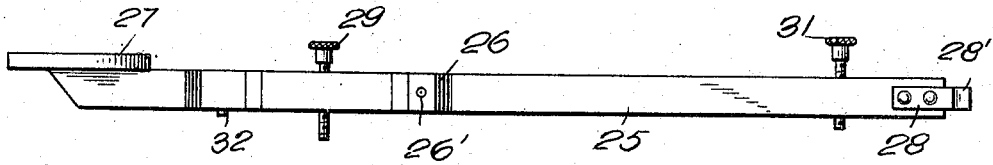

Of the said drawings, Figure 1 is a top plan view of the complete invention. Fig. 2 is a side elevation thereof, showing the normal or inoperative position of the key. Fig. 3 is a similar view showing the key in its operative position. Fig. 4 is a fragmental view of Fig. 1, showing the locking-switch engaged with the support for the key. Fig. 5 is a front view of the key-support. Fig. 6 is a section on the line 6 6 of Fig. 1, showing the mounting for the key-support. Fig. 7 is a side view of the key. Fig. 8 is a perspective view of the spring-contact finger carried by the key.

Referring more particularly to the drawings, 10 designates the base-plate of the device, upon which is mounted an arcuate metal plate 11, provided at opposite ends with elongated openings 10' for the screws 11', by means of which said plate is held in spaced relation to the upper face of the base-plate, one of said screws being connected with one of the terminal wires $a$ of a battery $b$, circuited with a sounder $c$, which is in turn connected with a binding-post $d$, carried by the base-plate and connected by the wire $e$, with a second arcuate plate 12, mounted upon the base-plate by means of screws $g$, one of which serves as the binding-post to which the end of the wire $e$ is attached. Plate 12 is formed concentric with plate 11 and is oppositely disposed with respect thereto, a plate 13, likewise of arcuate shape, being interposed between plates 11 and 12 adjacent the former and concentric therewith.

Mounted in the upper face of the base-plate is a metal plate 14, provided with an opening 14', through which the stem 15 of a pivot post or rod 16 extends, said rod being held in place therein by means of a second plate 17, which fits beneath plate 14, and is likewise provided with an opening through which the pivot-stem extends, plate 17 being secured in place by means of pins 17', which are removably inserted in sockets formed in the sides of the stem. The extreme lower end of said stem is reduced, as indicated by the reference-numeral 18, and fits in a similar socket 18', formed in a plate 19, disposed on the under face of the base.

The pivot-rod is further provided with an annular plate 20, located at the upper portion of its stem, the under face of said plate bearing against the upper face of the plate 14. Plate 20 is provided with a lateral extension 21.

The upper portion of the pivot-rod terminates in a pair of arms 22, diverging from each other and forming a yoke, each arm having a screw 23 working through an opening formed therein and carrying a lock-nut 24, by means of which said screws are retained in adjusted position.

The key 25, which is pivotally mounted between the arms of said yoke, is provided intermediate its ends upon opposite sides with the lateral extensions or shoulders 26, each of which carries a pin 26', whose sharpened end fits in a socket formed in the corresponding adjusting-screw end, whereby the key will have a rocking movement in a vertical plane with respect to said pivot-rod. The rear end of said key carries the usual operating-handle 27, while its opposite or front end has secured thereto a small resilient metal plate 28, which is bent to form a forwardly-extending finger 28', which is adapted to contact with a series of inwardly-extending projections $ff''$, formed on the inner edge of plate 11, during the horizontal movement of said key, as hereinafter more fully described. Key 25 is further provided toward its rear and front ends with a pair of screws 29 and 31, which work through openings formed therein, the screw 29 fitting within the coils of a spiral spring 30, one end of which is attached to the upper face of the extension 21 of plate 20, while its opposite end bears against the under face of the key 25, thus normally holding the rear or handle end of the key in elevated position, its opposite end being disposed adjacent the space between the base-plate and plate 11, with the lower end of screw 31 resting on the arcuate plate 13.

Disposed on the under face of the key between the screw 29 and the end thereof is a depending metal pin 32, which is adapted to travel across the upper face of plate 12, which is divided into a series of spaces $h$, each of which is marked with a letter corresponding to the diagonally opposite character formed by the projections $ff''$ on the plate 11. Each space on the plate 12 is separated from the adjacent spaces by a narrow transverse shoulder $h'$. As above stated, each set of projections on the plate 11 corresponds to the diagonally opposite letter on the plate 12, the blunted projections $f$ corresponding to the dashes of a letter of the ordinary telegraphic alphabet and the sharpened projections $f''$ in like manner to the dots, so that each group of projections on the plate 11 forms a single letter. It will thus be apparent that the key may be swung on its pivot until the pin 32 is directly above the letter to be formed or sounded, when the key will be depressed in the usual manner and again moved horizontally to bring the finger 28' on the plate 8 across the projections of the corresponding letter on plate 11, the make and break of the electric circuit caused by the movement of the finger across the projections operating the sounder $c$ in the usual manner, and thus indicating the precise sound telegraphically of any letter. It will be equally obvious that while the key is normally swung or moved from right to left, as indicated by the arrows in Fig. 1, it may be moved in the opposite direction to make or form the letters "N," "V," "R," &c., which are the reverse of the letters "A," "B," and "C."

After the sound of any desired letter is obtained and the operator desires to practice forming such letter a locking device is swung into engagement with the key-pivot and any horizontal movement thereof prevented, so that the key may be utilized and operated in the ordinary manner merely as a sender. To this end there is pivotally mounted upon a bolt 33, affixed to the base-plate, a lever 34, provided at one end with a laterally-extending finger 35, adapted to be received in a notch 35', formed in the plate 20, thus checking any tendency of the pivot to turn and limiting the movement of the key to its rocking or vertical movement.

Lever 34, which is provided with an operating-handle 36 at its opposite end, is circuited with the plate 12 by the wire $i$, one end of which is connected to the binding-screw 11' and the other end to the bolt 33, the lever thus forming a switch and disposed normally open.

Further description of the device and its manner of operation is thought unnecessary in view of the foregoing, it being understood that when the key is being moved horizontally the circuit is closed through the contact of pin 32 with plate 12 and the spring-finger 28' with the projections on the plate 11, the circuit being made and broken alternately during the passage of said finger over such projections.

What is claimed is—

1. In an omnigraph, in combination, an arcuate metal plate provided on its inner edge with a series of projections corresponding to the characters of a telegraphic alphabet; a pivoted key adapted to be moved into contact at one end with said projections; a sounder; and electrical connections between said key, plate, and sounder, and a source of power.

2. In an omnigraph, in combination, a flat arcuate metal plate provided on its inner edge with a series of projections corresponding to the characters of a telegraphic alphabet; a key pivoted for horizontal movement and adapted to contact at one end with said projections; a sounder; and electrical connections between said key, plate, and sounder, and a source of power.

3. In an omnigraph, in combination, a base-plate; an arcuate metal plate mounted thereon and provided with a series of inwardly-extending projections formed on its inner edge and corresponding to the characters of a telegraphic alphabet; a key movable horizontally across said base and adapted to contact at one end with said projections; a sounder; electrical connections between said key, plate, and sounder, and a source of power; and means for normally holding said key out of contact with said projections.

4. In an omnigraph, an arcuate metal plate provided with a series of inwardly-extending projections formed on its inner face, and corresponding to the characters of a telegraphic alphabet, and a horizontally-movable key adapted to contact at one end with said projections.

5. In an omnigraph, an arcuate metal plate provided with a series of inwardly-extending projections formed on its inner edge, and corresponding to the characters of a telegraphic alphabet; a horizontally-movable key disposed adjacent said plate; and a forwardly-extending member secured to one end of said key and adapted to contact with said projections.

6. In an omnigraph, in combination, a base-plate; a pair of oppositely-disposed arcuate plates mounted thereon, one of said plates having a series of inwardly-extending projections formed on its inner edge and corresponding to the characters of a telegraphic alphabet; a key pivoted between said arcuate plates and adapted to contact with both of said plates when in use; and means for normally holding said key out of contact with said arcuate plates.

7. In an omnigraph, in combination, a base-plate; a pair of oppositely-disposed concentric arcuate plates mounted thereon, one of said plates having a series of inwardly-extending projections formed on its inner face and corresponding to the characters of a telegraphic alphabet; a horizontally-movable key pivoted intermediate its ends to said base, and provided at opposite ends with means adapted to contact with the corresponding arcuate plates, when said key is in its operative position; and means for normally holding said key in inoperative position.

8. In an omnigraph, in combination, a base; a plate mounted thereon and provided with a series of projections corresponding to the characters of a telegraphic alphabet; a key pivotally mounted in said base for movement both horizontally and vertically with respect thereto, said key being adapted during its horizontal movement to contact with said projections; and means mounted on said plate and adapted to be moved into engagement with said key to prevent such horizontal movement.

9. In an omnigraph, in combination, a base, a plate mounted thereon and provided with a series of projections corresponding to the characters of a telegraphic alphabet; a key pivotally mounted upon said base for movement both vertically and horizontally with respect thereto, said key including a notched, pivotal support adapted to turn therewith during such latter movement; means secured to one end of said key and adapted to contact with said projections during such horizontal movement; and means mounted on said base and adapted to be moved into engagement in said notch, to prevent such horizontal movement.

10. In an omnigraph, in combination, a base-plate; a pair of oppositely-disposed, concentric arcuate plates mounted thereon, one of said plates having a series of inwardly-extending projections formed on its inner edge; a depressible key pivoted intermediate its ends to said base between said arcuate plates and adapted to be moved horizontally across the latter; resilient means secured to one end of said key adapted to hc'd said key normally in inoperative position; and means carried by the opposite end of said key and adapted to contact with said projections during the horizontal movement of the key when the latter is in its operative position.

In testimony whereof I affix my signature in presence of two witnesses.

JAMES W. EARLES.

Witnesses:
 PAUL TURNER,
 WILLIAM ANDERSON.